United States Patent
Hoi Man Cynthia

(10) Patent No.: US 11,482,926 B2
(45) Date of Patent: Oct. 25, 2022

(54) DETACHABLE BLUETOOTH POWER SUPPLY APPARATUS

(71) Applicants: JDH SOURCING MANAGEMENT LIMITED, Hong Kong (HK); Gert Paul Alberts, Amsterdam (NL)

(72) Inventor: Tang Hoi Man Cynthia, Hong Kong (HK)

(73) Assignees: JDH Sourcing Management Limited, Hong Kong (HK); Gert Paul Alberts, Amsterdam (NL)

( * ) Notice: Subject to any disclaimer, the term of this patent is extended or adjusted under 35 U.S.C. 154(b) by 0 days.

(21) Appl. No.: 17/150,388

(22) Filed: Jan. 15, 2021

(65) Prior Publication Data
US 2021/0226529 A1    Jul. 22, 2021

(30) Foreign Application Priority Data
Jan. 17, 2020    (CN) .......................... 202020106655.8

(51) Int. Cl.
*H02J 7/00*    (2006.01)
*H02M 3/04*    (2006.01)

(52) U.S. Cl.
CPC ............ *H02M 3/04* (2013.01); *H02J 7/0063* (2013.01)

(58) Field of Classification Search
CPC ......... H02J 7/0063; H02J 7/0044; H02M 3/04
See application file for complete search history.

(56) References Cited

U.S. PATENT DOCUMENTS

2018/0064367 A1* 3/2018 Poore ................... A61B 5/0022

OTHER PUBLICATIONS

CN203914877 (English and original) (Year: 2014).*

* cited by examiner

*Primary Examiner* — Nguyen Tran
(74) *Attorney, Agent, or Firm* — Muncy, Geissler, Olds & Lowe, P.C.

(57) ABSTRACT

Disclosed is a detachable Bluetooth power supply apparatus, which includes a housing, a USB interface embedded in the housing and a Bluetooth power supply circuit arranged in the housing and electrically connected to the USB interface. The Bluetooth power supply circuit includes a storage battery, a DC power supply module connected to the storage battery and a Bluetooth control circuit connected to the DC power supply module and the USB interface. The detachable Bluetooth power supply apparatus is simple in structure, easy to control and convenient to replace and has very high practical value and popularization value.

3 Claims, 3 Drawing Sheets

DETACHABLE BLUETOOTH POWER SUPPLY APPARATUS

FIELD OF THE INVENTION

The present disclosure relates to the technical field of power supply, and in particular, to a detachable Bluetooth power supply apparatus.

BACKGROUND OF THE INVENTION

At present, in the prior art, Bluetooth control apparatuses, electric servo control apparatuses and chargeable battery control apparatuses are usually installed in electric toy products, daily life supplies and sporting goods with a Bluetooth function. This leads to complex internal structure design, high production cost, lack of flexibility, inconvenience in maintenance and difficulty in updating and upgrading. Meanwhile, by taking electric toys as an example, different types of electric toys have different Bluetooth control apparatuses, toy car motor control apparatuses and rechargeable battery control apparatuses, so that it is not conducive to the standardization and reuse of various control apparatus units and the reduction of the research and development time and cost of the electric toys.

Therefore, it is urgently required to provide a detachable Bluetooth power supply apparatus which is simple in structure, convenient to replace and strong in universality.

SUMMARY OF THE INVENTION

Aiming at the problems above, the present disclosure aims to provide a detachable Bluetooth power supply apparatus. The technical scheme of the present disclosure is as follows:

the detachable Bluetooth power supply apparatus includes a housing, a USB interface embedded in the housing and a Bluetooth power supply circuit arranged in the housing and electrically connected to the USB interface;

and the Bluetooth power supply circuit includes a storage battery, a DC power supply module connected to the storage battery, and a Bluetooth control circuit connected to the DC power supply module and the USB interface.

In some embodiments, the DC power supply module includes a DC conversion chip U2 with a pin Vin connected to a positive electrode of the storage battery and with the model number of DS9193-3.3V, a capacitor C1 with one end connected to the pin Vin of the DC conversion chip U2 and the other end grounded, a capacitor C2 with one end connected to a pin BP of the DC conversion chip U2 and the other end grounded, and a capacitor C3 and a capacitor C4 with, after being connected in parallel, one end connected to a pin Vout of the DC conversion chip U2 and the other end grounded.

In some embodiments, the Bluetooth control circuit includes: a Bluetooth chip U1 with a pin USB_D− connected to a pin D− of the USB interface, a pin USB_D+ connected to a pin D+ of the USB interface and a pin DC3.3V connected to the pin Vout of the DC conversion chip U2 and with a model number of HC-05; a diode D1 with an output cathode connected to a pin UART_TXD of the Bluetooth chip U1; a diode D2 with an input anode connected to a pin UART_RXD of the Bluetooth chip U1; a Bluetooth antenna connected between an input anode of the diode D1 and an output cathode of the diode D2; a resistor R1 with one end connected to the input anode of the diode D1 and the other end connected to the pin Vin of the DC conversion chip U2; a resistor R2 with one end connected to the pin UART_RXD of the Bluetooth chip U1 and the other end connected to the pin Vout of the DC conversion chip U2; a power switch chip U3 with a pin EN connected to a pin PIO3 of the Bluetooth chip U1 and a pin IN connected to the pin Vin of the DC conversion chip U2 and with a model number of SOT23-6; an inductor L1 with one end connected to a pin LX of the power switch chip U3 and the other end connected to a pin VCC of the USB interface; a resistor R8 and a capacitor C5 with, after being connected in parallel, one end connected to the pin VCC of the USB interface and the other end connected to a pin FB of the power switch chip U3; and a resistor R7 with one end connected to the pin FB of the power switch chip U3 and the other end grounded.

In some embodiments, the Bluetooth control circuit further includes a resistor R6 and a light-emitting diode D3 with, after being connected in series, one end connected to a pin PIO9 of the Bluetooth chip U1 and the other end grounded.

In some embodiments, the Bluetooth control circuit further includes a resistor R5 with one end connected to a pin PIO12 of the Bluetooth chip U1 and the other end grounded, a resistor R3 and an on-off switch BAFW with, after being connected in series, one end connected to the pin PIO12 of the Bluetooth chip U1 and the other end grounded, and a resistor R4 with one end connected to the on-off switch BAFW and the other end connected to the pin Vin of the DC conversion chip U2.

Compared with the prior art, the present disclosure has the following beneficial effects:

the Bluetooth chip U1 is skillfully used for receiving and transmitting a Bluetooth signal and controlling the on-off state of the power switch chip U3 to switch on and off the power of the storage battery. Meanwhile, working power is supplied to the Bluetooth chip U1 by means of arranging the DC power supply module; and moreover, the SOT23-6 is used as a power switch and the power supply is stable. In summary, the detachable Bluetooth power supply apparatus has the advantages of simple structure, easiness in control, convenience in replacement and the like and has quite high practical value and popularization value in the technical field of power supply.

DETAILED DESCRIPTION OF THE EMBODIMENTS

The present disclosure will now be further described with reference to the accompanying drawings and embodiments, which include, but are not limited to, the following embodiments. On the basis of the embodiments of the present application, all other embodiments obtained by those of ordinary skill in the art without creative work fall within the protection scope of the present application.

Figure 1:
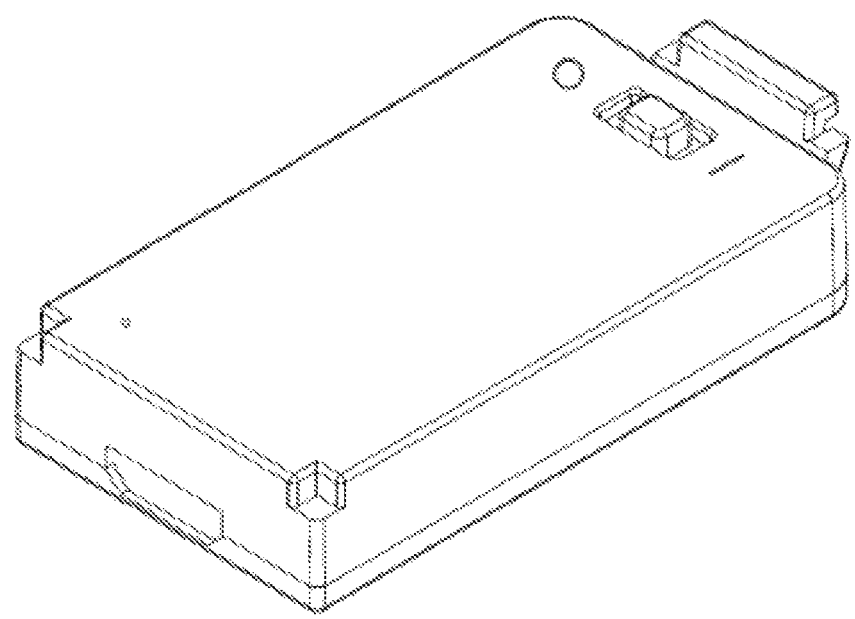
FIG. 1 is an outline structure diagram of an embodiment of the present disclosure.
Figure 2:
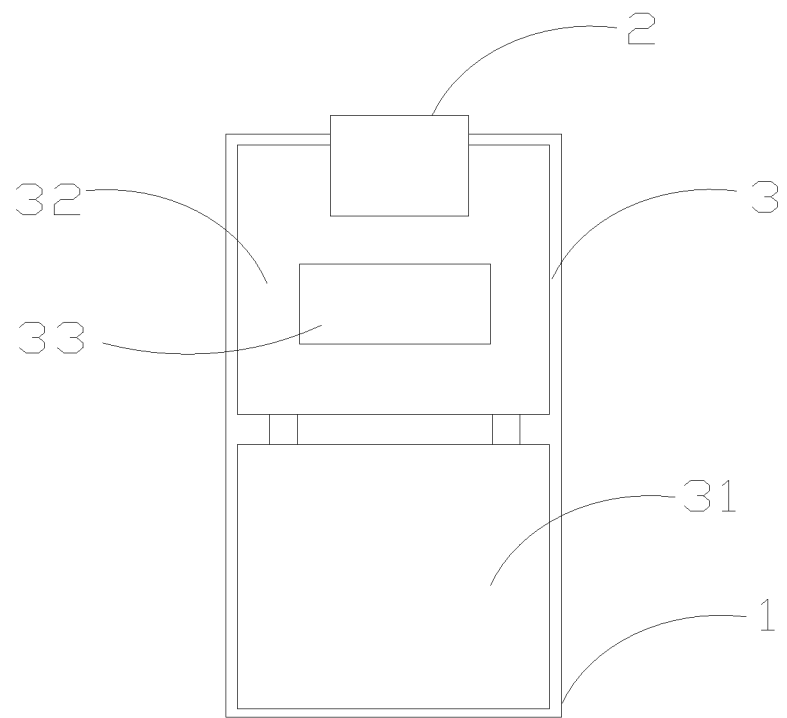
FIG. 2 is an internal structure diagram of an embodiment of the present disclosure.
Figure 3:
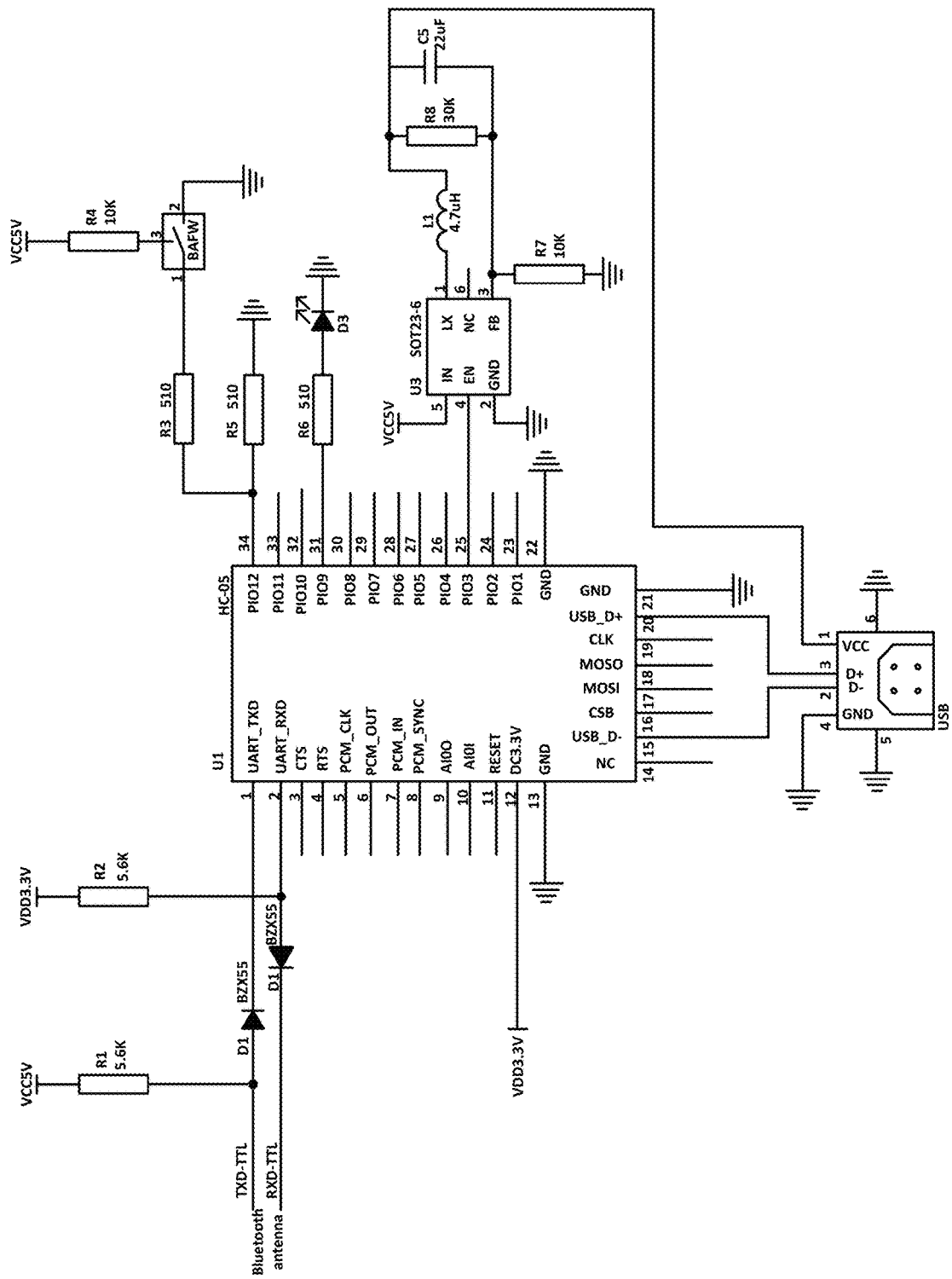
FIG. 3 is a schematic diagram of a Bluetooth control circuit of an embodiment of the present disclosure.
Figure 4:
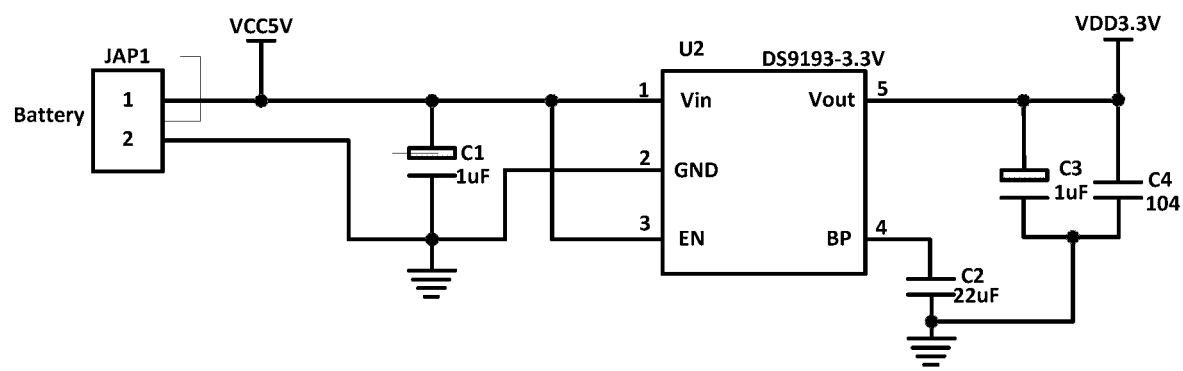
FIG. 4 is a schematic diagram of a DC power supply module of an embodiment of the present disclosure.

As shown in FIG. 1 to FIG. 4, the present embodiment provides a detachable Bluetooth power supply apparatus, including a housing 1, a USB interface 2 embedded in the housing 1 and a Bluetooth power supply circuit 3 arranged in the housing 1 and electrically connected to the USB interface. The Bluetooth power supply circuit 3 includes a storage battery 31, a DC power supply module 32 connected to the storage battery 31 and a Bluetooth control circuit 33 connected to the DC power supply module 32 and the USB interface 2. It should be noted that the terms "first", "second", etc. in this embodiment are used only to distinguish one type of component from another and should not be construed as specifically limiting the scope of protection. In addition, the present embodiment is based on a structure improvement, the program used therein is not improved, and the program is a conventional program fragment combination, which will not be described in detail herein.

The voltage of the storage battery of the present embodiment is 5 V, and in order to obtain DC 3.3V, the DC power supply module is arranged. The DC power supply module includes a DC conversion chip U2 with a pin Vin connected to a positive electrode of the storage battery and with the model number of DS9193-3.3V, a capacitor C1 with one end connected to the pin Vin of the DC conversion chip U2 and the other end grounded, a capacitor C2 with one end connected to a pin BP of the DC conversion chip U2 and the other end grounded, and a capacitor C3 and a capacitor C4 with, after being connected in parallel, one end connected to a pin Vout of the DC conversion chip U2 and the other end grounded.

In addition, in order to provide on and off of Bluetooth control power supply, the Bluetooth control circuit includes: a Bluetooth chip U1 with a pin USB_D− connected to a pin D− of the USB interface, a pin USB_D+ connected to a pin D+ of the USB interface and a pin DC3.3V connected to the pin Vout of the DC conversion chip U2 and with a model number of HC-05; a diode D1 with an output cathode connected to a pin UART_TXD of the Bluetooth chip U1; a diode D2 with an input anode connected to a pin UART_RXD of the Bluetooth chip U1; a Bluetooth antenna connected between an input anode of the diode D1 and an output cathode of the diode D2; a resistor R1 with one end connected to the input anode of the diode D1 and the other end connected to the pin Vin of the DC conversion chip U2; a resistor R2 with one end connected to the pin UART_RXD of the Bluetooth chip U1 and the other end connected to the pin Vout of the DC conversion chip U2; a power switch chip U3 with a pin EN connected to a pin PIO3 of the Bluetooth chip U1 and a pin IN connected to the pin Vin of the DC conversion chip U2 and with the model number of SOT23-6; an inductor L1 with one end connected to a pin LX of the power switch chip U3 and the other end connected to a pin VCC of the USB interface; a resistor R8 and a capacitor C5 with, after being connected in parallel, one end connected to the pin VCC of the USB interface and the other end connected to a pin FB of the power switch chip U3; a resistor R7 with one end connected to the pin FB of the power switch chip U3 and the other end grounded; a resistor R6 and a light-emitting diode D3 with, after being connected in series, one end connected to a pin PIO9 of the Bluetooth chip U1 and the other end grounded; a resistor R5 with one end connected to a pin PIO12 of the Bluetooth chip U1 and the other end grounded; a resistor R3 and an on-off switch BAFW with, after being connected in series, one end connected to the pin PIO12 of the Bluetooth chip U1 and the other end grounded; and a resistor R4 with one end connected to the on-off switch BAFW and the other end connected to the pin Vin of the DC conversion chip U2.

In the present embodiment, the detachable Bluetooth power supply apparatus is quickly connected with an electric toy product by using the USB interface, so that it is incredibly simple in replacement; DC 5V is converted into DC 3.3 V by the DC power supply module; when and only when the Bluetooth antenna receives a signal indicating that a power supply is on, the Bluetooth chip U1 transmits a high level to the pin PIO3, and then, the pin LX outputs the high level and transmits the high level to the electric toy product through the USB interface; and after the Bluetooth antenna receives a signal indicating that the power supply is off, the Bluetooth chip U1 transmits a low level to the pin PIO3. Meanwhile, the present technology further provides power supply indication, which is displayed by the light-emitting diode D3.

In actual use, a detachable Bluetooth battery of the present disclosure can be configured into a lithium battery with Bluetooth configuration, can be used on a series of products (toys, such as toy cars and aircrafts; sporting goods, such as bicycles, appliances for various ball games and sport performance monitoring instruments; and life products, such as wristbands and watchbands) to add a Bluetooth function, can also be applied to audio equipment, and communication, location and tracking systems, can also be applied to watches to endow the watches with a Bluetooth system, can also be applied to the apparatuses, such as an earphone, and can further bring users more flexible choice and experience by being matched with software development and mobile phone applications.

The products of the present disclosure can be updated and upgraded continually, are convenient to maintain and are small, so that each product does not need to have a preset Bluetooth function; unique market requirements of different products are matched; the product cost is reduced; and the product is easy to market at lower cost and can be widely applied.

The above-described embodiments are merely preferred embodiments of the present disclosure and are not intended to limit the scope of the present disclosure. However, it is intended that all changes which come by using the design principle of the present disclosure and performing non-creative labor on this basis shall fall within the protection scope of the present disclosure.

The invention claimed is:

1. A detachable Bluetooth power supply apparatus for supplying power to an external device, comprising a housing, a USB interface embedded in the housing, and a Bluetooth power supply circuit arranged in the housing and electrically connected to the USB interface, the USB interface being configured to be connected to the external device, wherein the Bluetooth power supply circuit comprises:
    a storage battery,
    a DC power supply module connected to the storage battery, the DC power supply module having a first terminal and a second terminal, the first terminal being connected to the storage battery, and
    a Bluetooth control circuit comprising a Bluetooth controller, a Bluetooth antenna and a power switch controller, the Bluetooth controller having a third terminal and a fourth terminal, the third terminal being connected to the second terminal of the DC power supply module, the power switch controller having a fifth terminal connected to the fourth terminal of the Bluetooth controller and a sixth terminal connected to the USB interface, when the Bluetooth antenna receives a signal indicating that a power supply is on, the Bluetooth controller transmits a high level to the fourth pin, and the sixth pin of the power switch controller transmits the high level to the external device via the USB interface, and when the Bluetooth antenna receives a signal indicating that the power supply is off, the Bluetooth controller transmits a low level from the fourth terminal to the fifth terminal of the power switch controller, thereby turning off the power supply to the external device.

2. The detachable Bluetooth power supply apparatus according to claim 1, wherein the Bluetooth control circuit further comprises a resistor R6 and a light-emitting diode D3 with, after being connected in series, one end connected to a pin PIO9 of the Bluetooth controller and the other end grounded.

3. The detachable Bluetooth power supply apparatus according to claim 2, wherein the Bluetooth control circuit further comprises: a resistor R5 with one end connected to a pin PIO12 of the Bluetooth controller and the other end grounded; a resistor R3 and an on-off switch BAFW with, after being connected in series, one end connected to the pin PIO12 of the Bluetooth chip controller and the other end grounded; and a resistor R4 with one end connected to the on-off switch BAFW and the other end connected to the pin Vin of the DC power supply module.

\* \* \* \* \*